Figure 1:
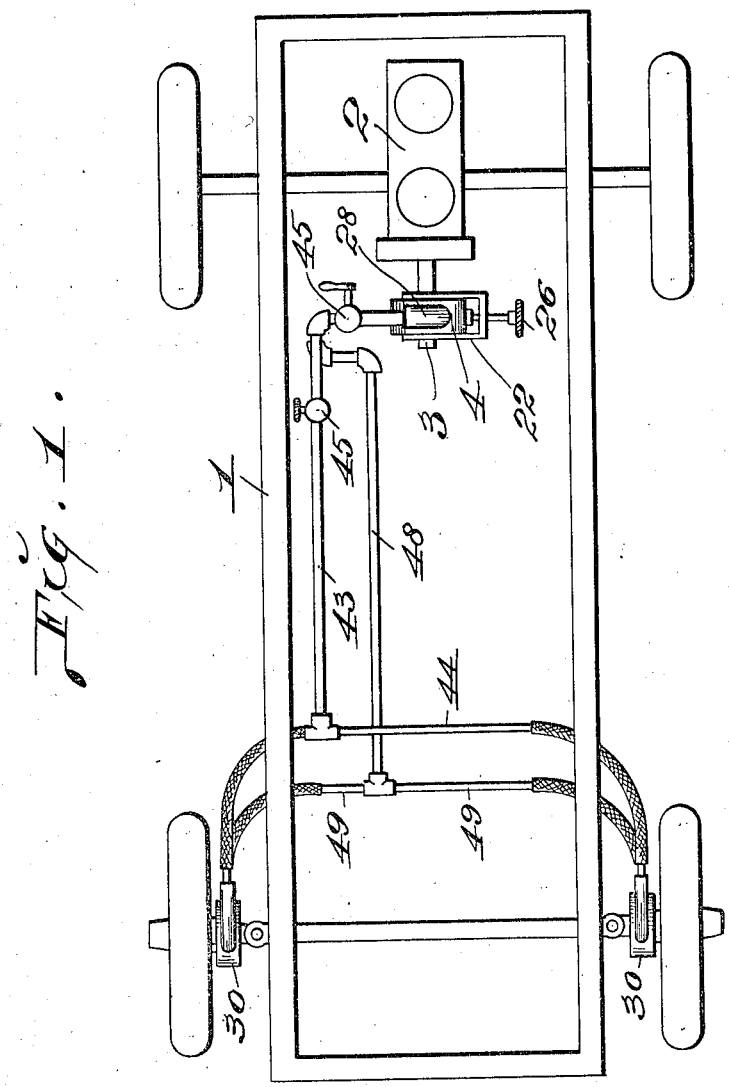

No. 872,203. PATENTED NOV. 26, 1907.
V. C. SHANK.
HYDRAULIC TRANSMISSION DEVICE.
APPLICATION FILED JUNE 26, 1906.

3 SHEETS—SHEET 1.

Attest,
M. P. Smith
H. J. Fletcher.

Inventor,
Victor C. Shank.
By Higdon & Longan
Attys

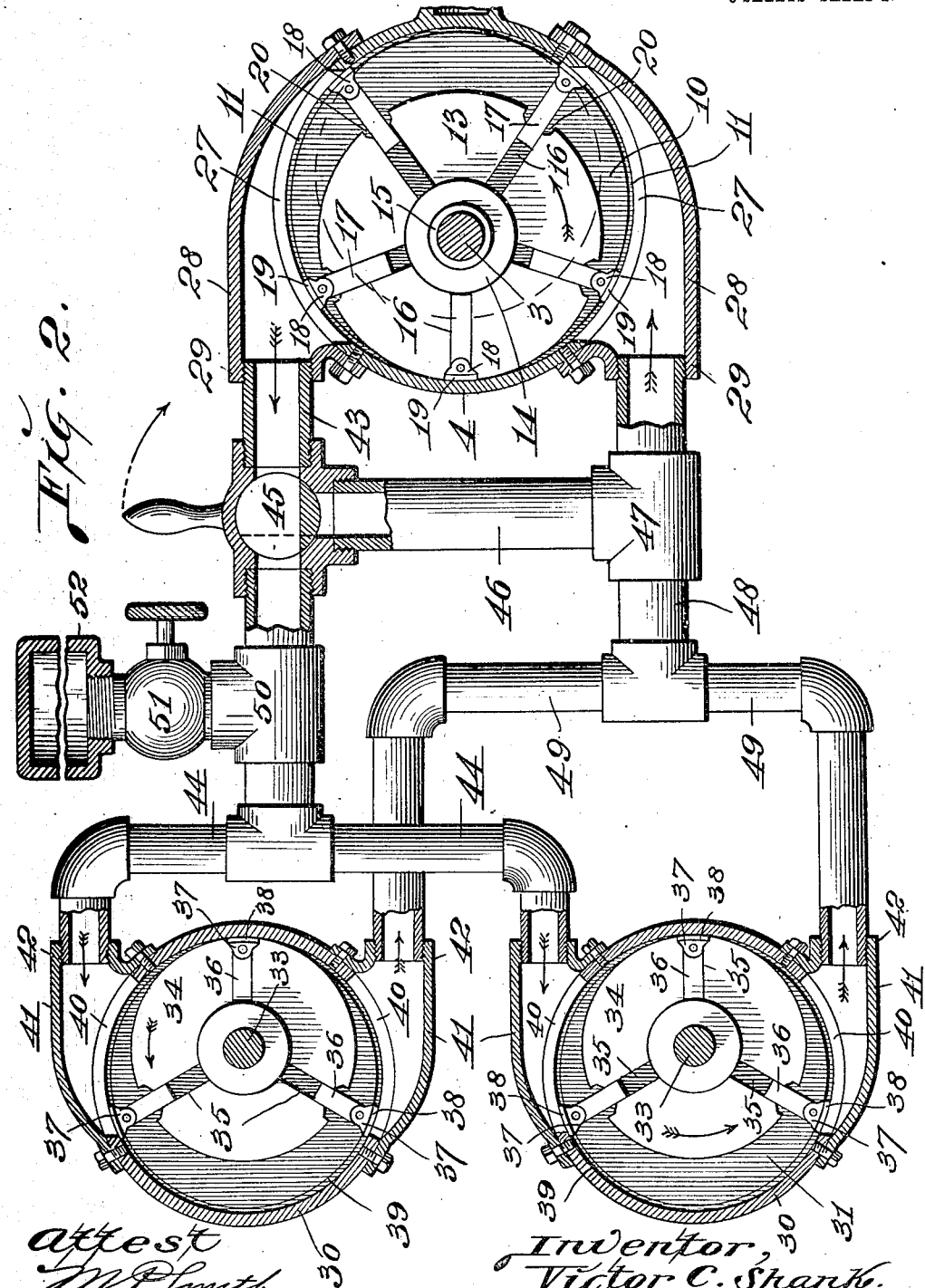

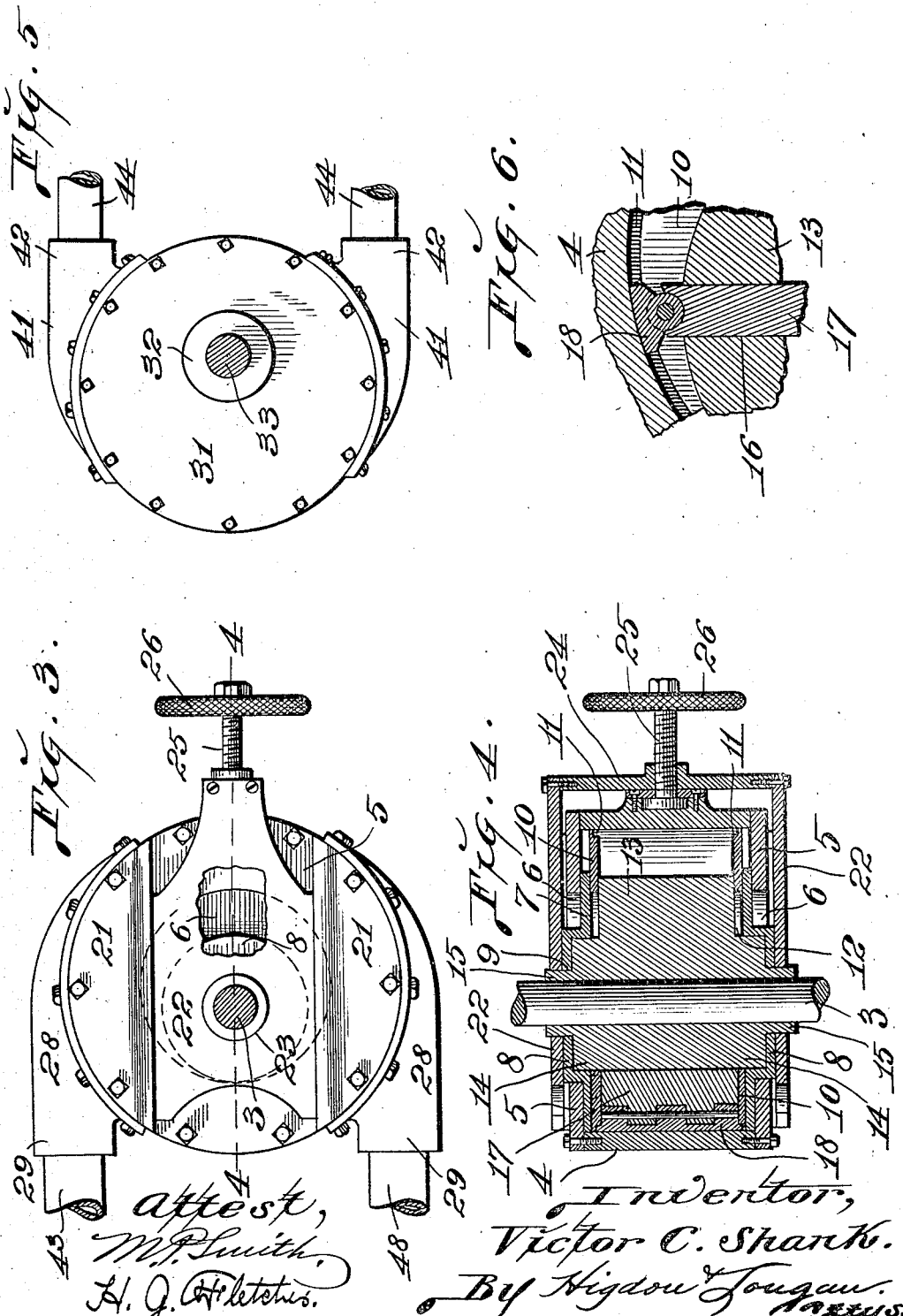

UNITED STATES PATENT OFFICE.

VICTOR C. SHANK, OF ST. LOUIS, MISSOURI.

HYDRAULIC TRANSMISSION DEVICE.

No. 872,203.  Specification of Letters Patent.  Patented Nov. 26, 1907.

Application filed June 26, 1906. Serial No. 323,527.

*To all whom it may concern:*

Be it known that I, VICTOR C. SHANK, a citizen of the United States, and resident of St. Louis, Missouri, have invented certain new and useful Improvements in Hydraulic Transmission Devices, of which the following is a specification containing a full, clear, and exact description, reference being had to the accompanying drawings, forming a part hereof.

My invention relates to a hydraulic transmission device, and the object of my invention is to construct a simple inexpensive device comprising a minimum number of parts, which is adapted for use in transmitting rotary motion to one or more shafts or wheels, as, for instance, from the engine or motor of a motor vehicle to the wheels or axles thereof.

A further object of my invention is to construct a hydraulic transmission device wherein gearing and friction wheels are dispensed with, thereby greatly reducing the size and cost of devices of this character.

A further object of my invention is to construct a hydraulic transmission device which is particularly applicable for motor vehicles, and which is so arranged as that it will perform the functions of the brake, a differential gearing, and the variable speed gearing ordinarily made use of in motor vehicles.

My invention consists in a pump, which is preferably located on the engine or motor shaft, and with a plurality of motors which are located on the wheels or axles to be driven, together with suitable tubular connections from the pump to the motors.

My invention further consists in certain novel features of construction and arrangement of parts, which will be hereinafter more fully set forth, pointed out in the claims, and illustrated in the accompanying drawings, in which:—

Figure 1 is a plan view of a motor vehicle frame, and showing my improved hydraulic transmission device applied thereto; Fig. 2 is a diagrammatic view, partially in section, illustrating the pump and motors, and the tubular connections between said pump and motors; Fig. 3 is a side elevation of the pump used in my improved transmission device; Fig. 4 is a horizontal section taken on the line 4—4 of Fig. 3; Fig. 5 is a side elevation of one of the motors I make use of in carrying out my invention; Fig. 6 is a detail section illustrating a portion of one of the sliding valves or plates made use of in the pump and motors, and a shoe carried by said valve or plate.

Referring by numerals to the accompanying drawings:—1 designates a motor vehicle frame of any suitable construction, 2 the engine or motor for driving the vehicle, and 3 the engine or motor shaft.

The pump of my improved apparatus comprises a cylindrical shell, or ring, 4, and bolted to the edges thereof are side plates 5, in the centers of which are formed circular apertures 6. Arranged to slide on the inner faces of each of the plates 5 are plates 7, with which are formed integral the outwardly extending circular portions 8, which are somewhat smaller in diameter than are the openings 6 through which said portions 8 project, and formed in the centers of these outwardly projecting portions 8 are circular apertures 9. Rigidly fixed on the interior of the shell or ring 4, and lying immediately against the inner faces of the plates 7 are plates 10, the outer edges of which fit against the inner face of said shell or ring 4, and there being a groove 11 formed on the inner face of each plate adjacent the edge thereof. Formed through each plate 10 is a centrally arranged circular opening 12, which is of the same diameter as is the circular opening 6.

The engine shaft 3 passes transversely through the openings 6, 9, and 12, and rigidly fixed on said shaft within the casing is a cylindrical piston 13, which is somewhat smaller in diameter than is the interior diameter of the shell or ring 4. Formed integral with the side faces of this piston are the hubs 14, which occupy the outwardly projecting portions 8 of the plates 7, and integral with these hubs 14 are the trunnions 15, which fit snugly within and project through the circular openings 9 in the portions 8. Formed at regular intervals in the body of the rotary piston 13 is a series of radially arranged slots 16, in which are adapted to slide plates or valves 17, to the outer end of each of which is hinged a transversely arranged shoe 18, and the outer ends of each shoe are provided with the flanges 19, which occupy and travel in the grooves 11 formed in the edges of the plates 10. The periphery of the rotary piston 13, adjacent the slots 16, is cut away, as designated by 20 in order to receive the outer portions of the shoes 18 when the same are moved inwardly to their limit of movement following the inward movement of the plates 17.

Rigidly fixed to the outer faces of each plate 5 are the oppositely arranged pairs of guide plates 21, and arranged to slide against the outer face of each plate 5, between each pair of guide plates is a plate 22; and each plate is provided with a suitably located aperture 23, which receives the corresponding trunnion 15 of the rotary piston 13. The rear ends of the plates 22 extend beyond the edge of the pump casing, and are there connected by a cross bar 24, and passing through the center thereof is a screw-threaded shaft 25, the inner end of which is arranged for rotation in a suitable bearing formed on the outer surface of the ring 4, and the outer end of the shaft 25 is provided with a hand-wheel 26.

It will readily be understood that the shaft 25 and hand-wheel 26 may be replaced by a lever, or any suitable mechanism, for engaging the cross bar 24 and plates 22 to shift the same longitudinally.

Formed through the ring or casing 4, on opposite sides thereof, are openings 27, and fixed to said ring or casing, and inclosing said openings, are suitable housings 28, provided with tubular extensions 29.

Each of the motors of my improved apparatus comprises a cylindrical shell 30, the sides of which are closed by plates 31, and eccentrically arranged on each plate is a suitable bearing 32. Passing through the bearings 32 is a shaft 33 which is to be driven, and rigidly fixed thereon within the casing is a piston 34, which is somewhat smaller in diameter than is the interior diameter of said shell 30, and the shell of said piston normally bears against the inner face of the shell 30 owing to the eccentric arrangement of said piston. Formed in the piston 34 is a series of radially arranged slots 35, and arranged to slide therein are the plates or valves 36, the outer ends of which carry shoes 37, in every way similar to the shoes 18 previously described, and there being flanges 38 corresponding to the flanges 19, which flanges 38 travel in grooves 39 formed in the plates 31, immediately adjacent the inner face of the shell 30. Formed through the shell 30, and directly opposite the center of the piston 34, are the openings 40, which are inclosed by suitable housings 41 fixed to the exterior of the shell 30, and which housings are provided with suitable tubular extensions 42. Leading outwardly from the upper one of the tubular portions 29 of the upper housing 28 is a pipe or tube 43, and connected to the outer end thereof by means of a T-connection are the pipes or tubes 44, which lead to the housings 41 on top of the shells 30 of the motor casings.

Where my improved device is used in connection with motors which shift or swing laterally, the tubular connections 44 may be flexible, as shown in Fig. 1.

Located in the pipe or tube 43 is a suitable two-way valve 45, and leading from the housing thereof is a pipe 46, which connects by means of a suitable T 47 to the pipe or tube 48, which leads from the housing 28 at the lower end of the shell or ring 4 of the pump casing. This tube 48 extends a suitable distance from the T-connection 47, and unites with the branch pipes 49 which lead to the housings 41 on the under side of the rings 30 of the motor casings. Located in the pipe 43 outside the valve 45 is a T-connection 50, to which is fixed a suitable valve 51, the upper end of which carries a small cylinder 52, the upper end of which is closed.

When a transmission device of my improved construction is equipped for use, the spaces on the interior of the pump casing and motor casings, together with the tubular connections between said pump and motors, and a portion of the cylinder 52, are filled with a heavy fluid, such as oil, or glycerin.

The shaft 3 being rotated drives the rotary piston 13 on the interior of the pump casing, and the valves or plates 17 traveling around through the space to one side of said piston, which is eccentrically mounted, will slide outwardly in their respective slots 16 owing to the engagement of the flanges 19 in the grooves 11, and, as a result, the fluid is trapped between these sliding valves, or plates, and delivered from the lower one of the housings 28 to the upper one, and forced therethrough and through the tube 43.

The valve 45 being turned so as to allow free passage through said tube 43, the fluid is driven to and through the branch pipes 44, and enters the motor casings through the housings 41 on top thereof, and the pressure of the fluid on the plates or valves 36 carried by the pistons 34, eccentrically mounted in the motor casings, will cause said pistons to rotate in their respective casings, and thus impart rotary motion to the shafts 33 on which said pistons are fixed.

The valves or plates 36 during this rotation move outwardly through their respective slots 35 owing to the engagement of the flanges 38 of the shoes 37 in the grooves 29; and thus the fluid is carried around by said moving plates or valves from the tops of the motor casings to the bottoms thereof, and said fluid will discharge through the openings 40 and housings 41 at the bottoms of said casings, and from thence will flow through the branch pipes 49, and from thence through the pipe 48, and thus be delivered back to the housing 28, which covers the opening 27 at the lower end of the pump casing.

When the valve 45 is shifted so as to cut off the passage of the fluid through the pipe 43, the fluid will discharge from said pipe 43 through said valve 45 to the pipe 46, and be delivered therefrom through the T-connection 47 back to the pipe 48, and from thence to the under side of the pump casing. Thus the pump will operate without imparting rotary motion to the motors, and during this opening and closing operation the valve performs the function of a clutch.

When the entire device is in operation, and the valve 45 is suddenly closed, it performs the function of a brake, inasmuch as the power of the motors is cut off; and, as a result the pistons therein will cease to rotate.

The cylinder 52 being partially filled with fluid leaves an air space in the upper end of said cylinder, and when the valve 51 is opened, and either one or both of the motors are subjected to a sudden jar or shock which has a retarding effect on said motors, the back pressure will cause the fluid to rise in the cylinder 52, and compress the air in the upper end of said cylinder. This arrangement provides for a resilient shock absorber, which is essential in devices of this character, and it also provides for an excess supply of fluid, which is necessary in case there is any slight leakage of the fluid from the pump, motors, and tubular connections.

The motors operate independently, and either shaft 33 may rotate faster or slower than the other, as, for instance, when the device is applied to a motor vehicle and said vehicle is traveling around a curve, and thus the arrangement of said motors provides for the differential motion of the shafts 33, and performs the function of the ordinary differential gearing used in motor vehicles, and the like.

The rotary piston 13 in the pump can be readily shifted from one side of the pump casing to the other, as shown by dotted lines in Fig. 2, by manipulating the handwheel 26 and screw shaft 25, or other shifting mechanism, so as to readily reverse the direction of flow of the fluid through the tubular connections and motors, thus performing the function of a reversing gear. When this reversing action takes place, the pump casing moves transversely relative the plates 22, and the rotary piston 13, carrying the plates 17, moves from one side of the pump casing to the other, and to accommodate this shifting movement, the openings 6 and 12 in the plates 5 and 10 are of sufficient size to accommodate the circular extensions 8 and the hubs 14. The ends of the pipes 43 and 48 must necessarily have sufficient freedom or resiliency to permit the pump housing 4 to shift transversely relative to the engine shaft 3 when this adjustment or reversing action takes place. The right hand ends of the pipes 43 and 48 are connected with the pump 4, and the left hand ends thereof are connected by flexible tubes to the motor 30, and as said pipes are in actual practice five or six feet in length, and their extreme movement at their right hand ends is only two or three inches, it will readily be understood how the pump casing will move transversely relative said pipes. The pipes 43 and 48 are loosely carried on the frame 1 of the machine; and, if desired, their right hand ends may be connected to the pump casing by short sections of flexible tubing.

The rotary piston 13 in moving from one side of the casing to the other performs the function of a varible speed gearing, inasmuch as when said piston is moved so that its periphery is a slight distance away from the ring 4 there will necessarily be a small quantity of fluid carried through this slight space by the plates or valves 17, and consequently the pressure of the motors will be correspondingly decreased. This pressure proportionately decreases as the piston 13 moves toward the center of the pump casing, and when operating in said center thereof there will be no motion imparted to the motors, owing to the fact that the fluid in the pump casing will be carried around continuously by the plates or valves 17. This arrangement does away with the large number of pinions usually employed in valve speed gearing.

A transmission device of my improved construction is simple, inexpensive, noiseless in operation, is applicable for use wherever it is desired to transmit rotary motion from a driving shaft to one or more driven shafts; and the device as herein specified is particularly adapted for use in connection with motor vehicles.

I claim:—

In a hydraulic transmission device, the combination with a pair of motors, of a pump, comprising a shell, plates fixed to the sides thereof in the centers of which plates are formed openings, plates arranged to slide against the inner faces of the first mentioned plates, which inner plates are provided with projections extending through the openings in the outer plates, a third pair of plates rigidly arranged within the shell and bearing against the inner faces of the second pair of plates, there being openings formed in the centers of the third pair of plates, a shaft passing transversely through the shell, a cylindrical piston fixed on the shaft within the shell and connected to the second pair of plates, a series of radially arranged plates carried by the piston, shoes hinged to the outer ends of the last mentioned plates, guide plates fixed on the side plates of the shell, plates arranged to slide between said guide plates, and which sliding plates are connected to the rotary piston, and means arranged on the shell whereby the sliding plates are simultaneously shifted.

In testimony whereof, I have signed my name to this specification, in presence of two subscribing witnesses.

VICTOR C. SHANK.

Witnesses:
M. P. SMITH,
E. B. LINN.